March 16, 1937. C. W. ROVINSKY Re. 20,298

ELECTRICAL INSECT EXTERMINATOR

Original Filed May 15, 1933

INVENTOR.
Cosmos W. Rovinsky
BY
Ralph E. Baker
ATTORNEY.

Reissued Mar. 16, 1937 Re. 20,298

UNITED STATES PATENT OFFICE 20,298

ELECTRICAL INSECT EXTERMINATOR

Cosmos W. Rovinsky, Menominee, Mich.

Original No. 1,986,361, dated January 1, 1935, Serial No. 671,118, May 15, 1933. Application for reissue February 21, 1935, Serial No. 7,641

3 Claims. (Cl. 43—112)

This invention relates to an electrical apparatus for exterminating insects. It has to do particularly with a device which may be manufactured as a separate accessory, or one embodying a structure which may be built into an electrical wiring system. The structure contemplated embodies exposed conductors situated so that an insect may bridge two or more live conductors whereby the current may pass through the body of the insect. Since the conductors for this purpose are necessarily exposed, a novel arrangement is provided in conjunction with a socket or the like for receiving a light bulb or other electrical fixture, such as a plug, wherein the light bulb or plug, when properly fitted in its socket, forms a part of the conductors leading to the exposed conductors, so that these exposed conductors are disconnected from the source of electrical supply upon the removal of the light bulb or plug. This is a safety factor as will be later brought out in more detail.

Figure 1:
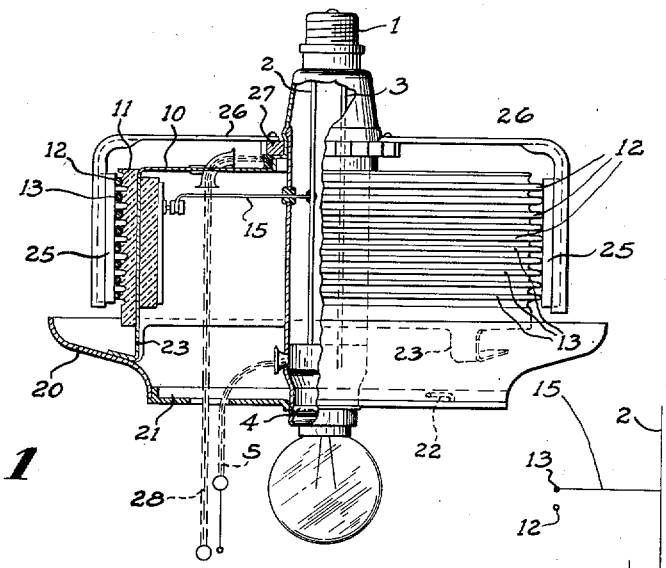
Fig. 1 is a view of the device with parts broken away and parts in section showing some of the interior structure and the exposed conductors.

The attached drawing shows a device in the nature of a separate unit or accessory which may be used in conjunction with an ordinary socket, and for which purpose it has a plug 1. Two lead wires 2 and 3 extend to a socket 4 which may have the usual switch therein controllable by a pull chain 5 and arranged to receive a light bulb 6.

Figure 3:
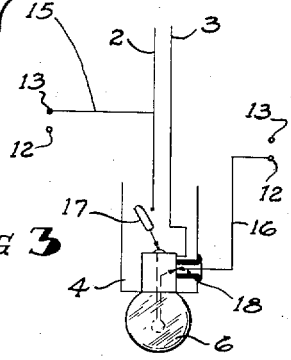
Fig. 3 is a diagrammatic view of a wiring layout.
Figure 2:
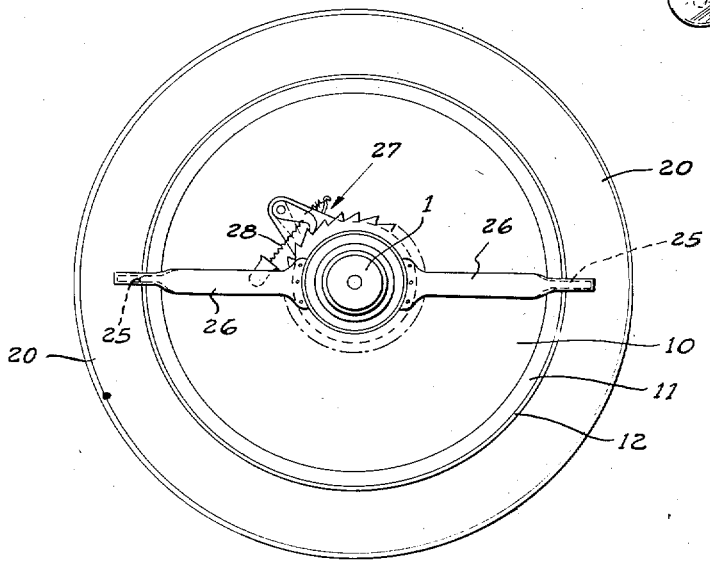
Fig. 2 is a top plan view.

The device may comprise a shell 10 which may have any desired shape, and as shown in Fig. 2, has a circular shape, and on the peripheral portion thereof is insulating material 11 carrying a plurality of spaced conductor rings 12 and 13 alternately arranged. A conductor wire 15 may connect one of the leads, such as lead 2, to the exposed conductors 13 as illustrated in Fig. 1. The other exposed conductors 12 are connected through the means of a lead 16 which is arranged to contact with a part of a contact member of the bulb 6. The switch (Fig. 3) of the socket 4 may be an ordinary single pull switch, as illustrated at 17, which may be opened and closed by pulling the chain 5 and this switch may be located for example, in the lead 2 with the lead 3 running directly to the base of the lamp. The lead 16 may be insulated from the socket 4 and extend through the same to contact with the usual screw threaded part of a lamp or plug when the same is screw threaded in the socket, as illustrated at 18. Thus, whenever a light bulb is in the socket, the exposed conductors 12 and 13 are energized so that at any time any two of them are bridged, the circuit is as follows: Lead 2, conductor 15, across the body bridging the exposed conductors 13 and 12, through lead 16 to the base of the bulb 6 to lead 3. The switch 17 may be opened and closed as desired without affecting this circuit but any time the bulb is removed the circuit, for energizing the exposed conductors, is broken. The exposed conductors 12 and 13 may be metallic rings connected in parallel as shown. It will be obvious therefore that an insect alighting on the member and happening to bridge any two of the conductors 12 and 13 will be immediately electrocuted. The insects may fall into a tray 20 and thence into a removable bottom portion 21. The bottom portion 21 may be removed only after the bulb 6 is removed to discharge the accumulated dead insects and as soon as the bulb 6 is removed the device may be handled by any person for cleaning purposes or the like without danger of being shocked. The parts 20 and 21 may be connected by suitable joints such as bayonet slot joints 22. Brackets 23 may hold the part 20 to the shell 10.

A further feature resides in means for cleaning the exposed conductors. For this purpose rubber wipers or wipers of other suitable non-conducting material may be used and these are shown at 25 of which there are two in the present instance. They may be carried by arms 26 rotatably mounted as at 27. Suitable ratchet means may be used to revolve these wipers with step-by-step movement by means of a pulling action on the chain 28. Thus by pulling the chain a number of times the wiping blades may be caused to revolve with respect to the shell and clean the exposed surfaces of the conductors 12 and 13.

I claim:

1. A device substantially for the purpose described comprising, a supporting member having a plurality of sets of alternate exposed electrical conductors, a socket for the reception of a light bulb or the like, a pair of lead wires running to the socket, conductor means connecting one of the lead wires to one set of alternate exposed conductors, another conductor leading from the other set of alternate exposed conductors into the socket and insulated from the socket, said last named conductor being adapted to make contact with a contact member on the base portion of a bulb or the like situated in the socket, which contact member connects to the other of said lead wires whereby the circuit to the exposed conductors is dependent upon the presence of a bulb or the like in the socket.

2. A device substantially for the purpose described comprising a supporting member having a plurality of sets of alternate exposed electrical conductors, a socket for the reception of a light bulb or the like, a pair of lead wires running to the socket, conductor means connecting one of the lead wires to one set of alternate exposed conductors, another conductor leading from the other set of alternate exposed conductors into the socket and insulated from the socket, said last named conductor being adapted to contact with a contact member on the base portion of a bulb or the like situated in the socket, which contact member is for establishing a connection to the other of said lead wires whereby the circuit to the exposed conductors is dependent upon the presence of a bulb in the socket, and a single pull switch in the first mentioned lead wire.

3. A device substantially for the purpose described comprising, a supporting member having a plurality of sets of exposed electrical conductors in alternate relation, means for the reception of an insect attracting element, lead wires connected to the attracting element, conductors extending from the lead wires, one of the second named conductors being connected to the receiving means, another of the second named conductors being connected to one set of alternate exposed conductors, and another set of alternate exposed conductors being connected to the conductor of the receiving means, said last named conductor having circuit making and breaking connections with the receiving means whereby the circuit may be made upon insertion of an electrical lure device in the receiving means.

COSMOS W. ROVINSKY.